United States Patent
Consonni et al.

(10) Patent No.: US 8,494,326 B2
(45) Date of Patent: Jul. 23, 2013

(54) TELECOMMUNICATION CABLE EQUIPPED WITH TIGHT-BUFFERED OPTICAL FIBERS

(75) Inventors: Enrico Consonni, Milan (IT); Davide Ceschiat, Milan (IT)

(73) Assignee: Prysmian S.p.A., Milan (IT)

( * ) Notice: Subject to any disclaimer, the term of this patent is extended or adjusted under 35 U.S.C. 154(b) by 539 days.

(21) Appl. No.: 12/452,860

(22) PCT Filed: Jul. 30, 2007

(86) PCT No.: PCT/IB2007/002187
§ 371 (c)(1),
(2), (4) Date: Apr. 28, 2010

(87) PCT Pub. No.: WO2009/016424
PCT Pub. Date: Feb. 5, 2009

(65) Prior Publication Data
US 2010/0254668 A1  Oct. 7, 2010

(51) Int. Cl.
*G02B 6/44* (2006.01)
*G02B 6/02* (2006.01)

(52) U.S. Cl.
USPC ............................ 385/102; 385/109; 385/128

(58) Field of Classification Search
USPC ........................................ 385/102
See application file for complete search history.

(56) References Cited

U.S. PATENT DOCUMENTS

| | | | |
|---|---|---|---|
| 5,050,957 A * | 9/1991 | Hamilton et al. | 385/113 |
| 5,917,978 A | 6/1999 | Rutterman | |
| 6,658,184 B2 * | 12/2003 | Bourget et al. | 385/100 |
| 6,714,713 B2 | 3/2004 | Lanier et al. | |
| 8,188,191 B2 * | 5/2012 | Ikenaga et al. | 525/245 |
| 2003/0133679 A1 | 7/2003 | Murphy et al. | |
| 2008/0279514 A1 * | 11/2008 | Kundis et al. | 385/113 |

FOREIGN PATENT DOCUMENTS

| WO | WO 2005/022230 A1 | 3/2005 |
|---|---|---|
| WO | WO 2006/034722 A1 | 4/2006 |

OTHER PUBLICATIONS

International Search Report from the European Patent Office for International Application No. PCT/IB2007/002187, mailed Nov. 21, 2007.

* cited by examiner

*Primary Examiner* — Omar Rojas
(74) *Attorney, Agent, or Firm* — Finnegan, Henderson, Farabow, Garrett & Dunner, L.L.P.

(57) ABSTRACT

A telecommunication cable is equipped with at least one optical fiber coated by a tight buffer layer made from a polymeric material having an ultimate elongation equal to or lower than 100% and an ultimate tensile strength equal to or lower than 10 MPa. The above combination of features of the polymeric material forming the buffer layer provides an optical fiber which is effectively protected during installation operations and during use, and at the same time can be easily stripped by an installer without using any stripping tools, simply by applying a small pressure with his fingertips and a moderate tearing force along the fiber axis.

31 Claims, 3 Drawing Sheets

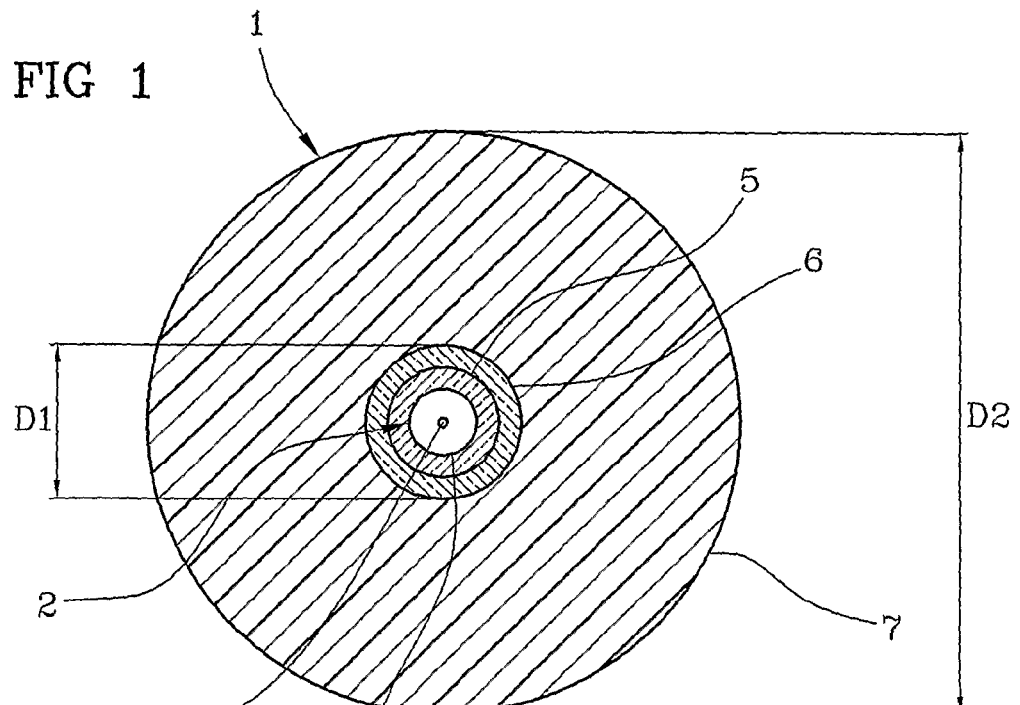
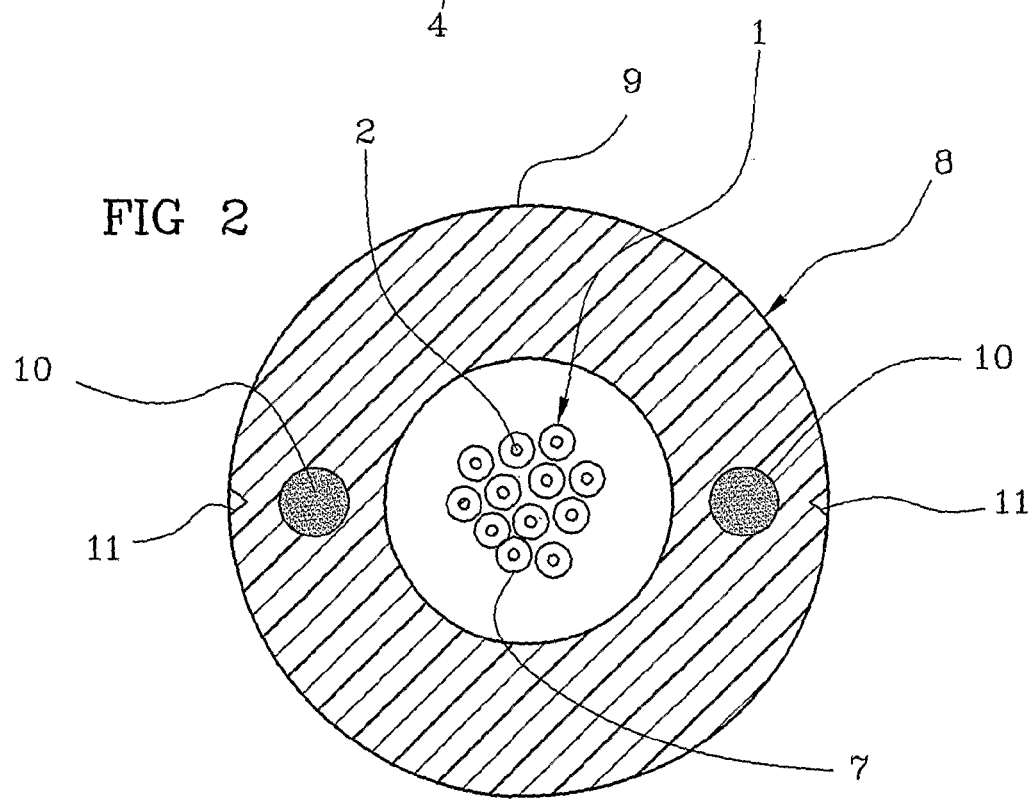

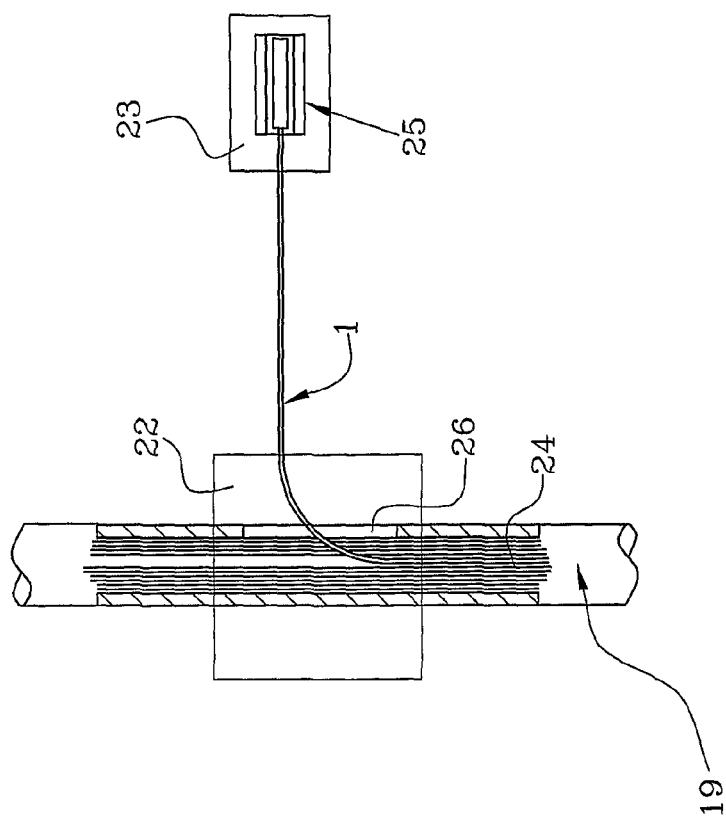
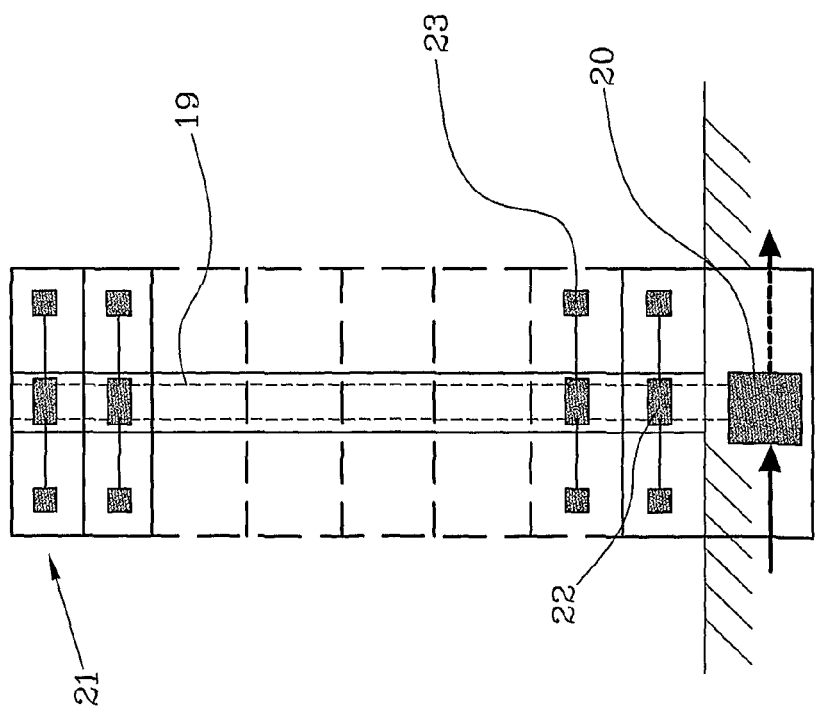

TELECOMMUNICATION CABLE EQUIPPED WITH TIGHT-BUFFERED OPTICAL FIBERS

CROSS REFERENCE TO RELATED APPLICATION

This application is a national phase application based on PCT/IB2007/002187, filed Jul. 30, 2007, the content of which is incorporated herein by reference.

BACKGROUND OF THE INVENTION

The present invention relates to a telecommunication cable equipped with at least one optical fiber. In particular, the present invention relates to a telecommunication cable equipped with at least one tight-buffered optical fiber, especially suitable for indoor installations.

An optical fibre generally comprises a core surrounded by a cladding, said core and cladding being preferably made of glass, and at least one coating. The combination of core and cladding is usually identified as "optical waveguide". Usually, the coatings of the optical waveguide are two. The coating directly contacting the optical waveguide is called "first coating" or "primary coating", and the coating overlying the first one is called "second coating" or "secondary coating". Typically, said first and second coatings are made of a polymeric material, such as a UV-curable acrylate polymer.

Certain applications require the optical fibre to be further coated by a buffer coating provided over the at least one coating.

Examples of these applications are indoor and premises installations, cable terminations, pigtails, patchcords and, more generally, those applications in which the optical fibre is subjected to repeated mechanical stresses because of recurring installation operations. When said buffer coating is provided substantially in contact with the at least one exterior coating it is said to be a "tight buffer". When said buffer coating is in the form of a tube having an internal diameter larger than the overall external coating diameter (the outer diameter of the optical fiber typically is of 240-250 µm), it is said to be a "loose buffer". Depending on the difference between the fiber outer coating diameter and the buffer inner diameter, a loose buffer can be identified as "loose" or "near tight". Typically, a buffered optical fibre can be used as semi-finished component to form a cable in association with other components as required by the specific use to which the cable is intended. In some applications, when additional protection is not required, the buffered optical fibre can be used as such to operate as a cable.

U.S. Pat. No. 5,917,978 discloses a buffered optical fiber which includes a coated optical fiber loosely contained within a space delimited by the inner surface of a plastic tube. The outer surface of the coated optical fiber is formed of a non-stick material such as Teflon™. Due to the non-stick coating on the coated optical fiber and the air gap around it, the improved cables may be stripped to any practical length. The outer diameter of the outer coating may be approximately 273 µm. The outer diameter of tube may be about 900 µm, and the inner diameter of the tube may be in the range 300 to 500 µm, with a preferred value being 400 µm. The plastic tube may be formed of any material, such as polyvinyl chloride material, suitable for use as the jacket of a 900 µm buffered fiber. Suitable materials may have a tensile strength in the range of 2000-4000 PSI (13.8-27.6 MPa) per ASTM D-412. A vertical extrusion process may be used to form the tube about a coated optical fiber. No vacuum is applied to the extrudate forming the tube as the extrudate exits the extrusion die.

U.S. Pat. No. 6,714,713 relates to a buffered optical fiber having a core, a cladding and at least one coating, and a buffer layer generally surrounding the optical fiber, wherein the buffer layer has a portion thereof generally contacting a portion of the at least one coating, the buffer layer having an average shrinkage of about 3 mm or less from a first end of the buffered optical fiber. Moreover, a buffered optical fiber is disclosed, wherein the buffer layer has an average strip force of about 5 Newtons or less when a 50 cm length of the buffer layer is stripped from an end of the buffered optical fiber. The buffer layer can be relatively loosely or tightly disposed around the optical fiber. For example, the optical fiber can have a nominal outer diameter of about 245 microns and the buffer layer can have a nominal inner diameter (ID) of about 255 to about 350 microns, more preferably about 255 to about 320 microns, and most preferably about 255 microns to about 270 microns, with an outer diameter of up to about 900 microns. In certain applications, it may be advantageous to strip the buffer layer in long lengths, for example, 50 cm or more in one pass. Long strip lengths may be accomplished with or without interfacial layer. The material of the buffer layer can have a predetermined ultimate elongation, for example, as measured using ASTM D-412. An ultimate elongation in the range of about 300% or more, and more preferably in the range of about 325% or more and most preferably about 350% or more is desired. Moreover, the material of the buffer layer may have a Shore D hardness, measured using ASTM D-2240, in the range of about 50 to 60. Examples of materials to be used for the buffer layer are GFO 9940DW, a thermoplastic elastomer (TPE), and Elastollan® 1154 D 10 FHF (BASF), a thermoplastic polyether-polyurethane (TPU). GFO 9940DW has an ultimate elongation of about 650% (ASTM D-412), and a Shore D hardness of about 48 (ASTM D-2240). Elastollan® 1154 D 10 FHF has an ultimate elongation of about 350% (ASTM D-412), and a Shore D hardness of about 58 (ASTM D-2240).

U.S. Pat. No. 6,215,931 relates to a telecommunications cable element having a transmission element disposed in a buffer tube made from thermoplastic polyolefin elastomeric buffer material having a modulus of elasticity below about 500 MPa at room temperature and a modulus of elasticity below about 1500 MPa at −40° C. The transmission element may be an optical fiber, a bundle of optical fibers or an optical fiber ribbon. The transmission element may be disposed in the buffering tube in a tight, near-tight or loose configuration. If the modulus of elasticity and elongation at break are low enough, a tight or near-tight buffer tube or member can be easily removed without special tools and without damaging the optical fiber or fibers disposed therein. Therefore, the modulus of elasticity of the buffer material is below about 500 MPa and the elongation at break is below about 500%, preferably below about 300%, both at room temperature. One example of a thermoplastic polyolefin elastomer having the above physical characteristics is a copolymer of propylene and ethylene, preferably having more than 10% by weight of ethylene. Another example is an ultra-low density polyethylene or a copolymer of ethylene and octene, the latter being preferably present in an amount greater than 10% by weight. The thermoplastic polyolefin elastomer material may also contain organic or inorganic fillers such as talc, calcium carbonate, carbon black, aluminum trihydride, magnesium hydroxide. In the examples, the thermoplastic polyolefin elastomer material has a modulus of elasticity of 120 MPa or higher and an elongation at break of 250% or higher.

SUMMARY OF THE INVENTION

The Applicant has faced the problem of providing optical cables particularly suitable for riser and horizontal indoor installations, e.g. in multi-floor buildings, with the aim of reducing both field labour and required installation skill.

The Applicant has noticed that cabling of a multi-floor building may require extraction of meters of the optical fiber from the riser cable to reach the end user connection at each floor. The forces exerted on the fiber during the extraction procedure can damage the optical fiber. A tight buffer should provide the optical fiber with a solid protection against such forces. On the other hand, to carry out the connection of the optical fiber to the recipient equipment (e.g. a termination box or the like), the buffer layer shall be peeled off from the optical fiber, and when the buffer layer is tight the stripping of the due length is difficult and can require special tools and skilled installers. Conversely, a loose buffer is easily strippable from the optical fiber, but it does not provide an adequate protection in an indoor cable system where a vertical position and the lack of adherence between optical fiber and buffer may cause tearing of the loose buffer and/or fiber microbending.

Moreover, when cabling a building, the optical fiber buffer layer needs to be congruent as much as possible to the optical fiber, preferably at a distance of about 100-150 cm from the stripping point (or less), in order to allow installation of an adjacent optical fiber in another recipient equipment (e.g. a termination box or the like), avoiding the risk that pulling movement on such adjacent fiber may disturb or otherwise affect the other fibers already connected or in the process of being connected.

The Applicant has now found that it is possible to install an optical fiber, extracted by a vertical cable (riser) within a building or the like, by providing a tight buffer protection to the optical fiber, in which said buffer has a combination of properties, including buffer-to-fiber clearance and mechanical strength of the buffer layer polymeric material, suitable to allow the stripping of a relatively low length of buffer, and to cause buffer-to-fiber congruence after a relatively short distance from the buffer end.

The above combination of features of the polymeric material forming the buffer layer allows to obtain an optical fiber which is effectively protected during the installation operations and during use, and at the same time can be easily stripped by the installer without using any stripping tools, simply by applying a small pressure with his fingertips and a moderate tearing force along the fiber axis. The stripping can be achieved in one pass, i.e. in a single stripping operation, for a length sufficient to have the optical fiber accessible for the subsequent jointing/splicing operations, for example from a few centimeters up to about 50 cm, without significant efforts. On the other hand, the tight configuration of the buffer layer ensures the desired congruence between optical fiber and buffer layer at a distance of about 100 cm from the end of the buffer layer. In other words, the optical fiber according to the invention is substantially unstrippable in one pass above a length of about 100 cm±30 cm.

Therefore, according to a first aspect, the present invention relates to a telecommunication cable equipped with at least one optical fiber coated by a tight buffer layer made from a polymeric material having an ultimate elongation equal to or lower than 100% and an ultimate tensile strength equal to or lower than 10 MPa.

According to another aspect, the present invention relates to an optical fiber coated by a tight buffer layer made from a polymeric material having an ultimate elongation equal to or lower than 100% and an ultimate tensile strength equal to or lower than 10 MPa. Ultimate elongation and ultimate tensile strength are measured, at 25° C., according to CEI EN 60811-1-1 (2001) standard.

Advantageously, the polymeric material of the buffer layer according to the invention has an ultimate elongation of at least 50%.

Advantageously, the polymeric material of the buffer layer according to the invention has an ultimate tensile strength of at least 4 MPa.

For the purposes of the present description and of the appended claims, with the term "tight buffer layer" it is meant a protective layer surrounding an optical fiber, the internal diameter of the protective layer being substantially the same of the outside diameter of the optical fiber. No appreciable buffer-to-fiber clearance is observed.

It should be noted that the tight buffer layer of the present invention shall not be confused with a so called "buffer tube". A buffer tube typically includes one or more optical fibers disposed within the same, possibly immersed in a water-blocking material (usually a grease) which inhibits migration of water which may penetrate into the buffer tube. Moreover, a buffer tube generally have a relatively large inner diameter when compared to the outer diameter of each optical fiber inserted therein, in order to allow the fiber to move freely thereinto.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

The optical fibre according to the present invention generally comprises an optical waveguide constituted by a light-transmitting core surrounded by a cladding.

Preferably, the optical waveguide according to the invention is a single-mode optical fibre. Alternatively, the optical waveguide may be of the multimodal type.

Preferably, the telecommunication cable according to the invention is equipped with from 12 to 48 optical fibers.

The optical waveguide is preferably surrounded by at least one protective coating, usually by two protective coatings. The first protective coating (primary coating) directly contacts the optical waveguide, while the second protective coating (secondary coating) overlies the first one.

Preferably, the optical waveguide has a diameter of from 120 µm to 130 µm. Preferably, the primary coating has a thickness of from 25 µm to 35 µm. Preferably the secondary coating has a thickness of from 10 µm to 30 µm.

According to a preferred embodiment, the optical waveguide has a diameter of from 120 µm to 130 µm, the primary coating has a thickness of from 18 µm to 28 µm, more preferably from 22 µm to 23 µm, and the secondary coating has a thickness of from 10 µm to 20 µm.

Preferably, the optical fiber before application of the tight buffer has a diameter of from 160 to 280 µm more preferably from 175 to 260 µm, more preferably from 240 µm to 250 µm.

The tight buffer layer of the optical fiber preferably has a thickness such as to provide a buffered optical fibre with a diameter of from 600 to 1000 more preferably from 800 to 900 µm.

Advantageously, the polymeric material of the buffer layer of the invention has an elasticity modulus (Young's modulus) equal to or lower than 100 MPa, measured according to ASTM D-638-97 standard.

Advantageously, the polymeric material of the buffer layer of the invention has a Shore D hardness lower than 50, measured according to ASTM D-2240 standard.

According to a preferred embodiment, the buffer layer has an average strip force, measured according to FOTP/184/TIA/EIA standard (effected with a stripping speed of 10 min/min) of from 0.10 N/15 mm to 0.50 N/15 mm, more preferably from 0.15 N/15 mm to 0.40 N/15 mm. The buffer layer has a peak strip force measured according to FOTP/184/TIA/EIA standard (effected with a stripping speed of 10 mm/min) of from 1.0 N/15 mm to 3.5 N/15 mm, more preferably from 1.5 N/15 mm to 2.0 N/15 mm. According to a preferred embodiment, the buffer layer has an average shrinkage, measured after 24 hours at 70° C., of from 3 mm/1000 mm to 15 mm/1000 mm, more preferably from 5 mm/1000 mm to 10 mm/1000 mm The polymeric material forming the buffer layer according to the present invention preferably comprises at least one polymer selected from: polyethylene, preferably low density polyethylene (LDPE), very low density polyethylene (VLDPE) or linear low density polyethylene (LLDPE); copolymers of ethylene with at least one $C_3$-$C_{12}$ alpha-olefin and optionally with at least one $C_4$-$C_{20}$ diene; copolymers of ethylene with at least one alkyl-acrylate or alkyl-methacrylate, preferably ethylene/butylacrylate copolymers (EBA); polyvinylchloride (PVC); ethylene/vinyl acetate copolymers (EVA); polyurethanes; polyetheresters; and mixtures thereof.

The polymeric material may further comprise, in admixture with the at least one polymer, at least one inorganic filler. Preferably, the inorganic filler is present in an amount of from 30 to 70% by weight, more preferably from 35 to 55% by weight, with respect to the total weight of the polymeric material.

The inorganic filler may be selected from: hydroxides, oxides or hydrated oxides, salts or hydrated salts, e.g. carbonates or silicates, of at least one metal, particularly of calcium, magnesium or aluminum. Preferred are: magnesium hydroxide, aluminum hydroxide, aluminum oxide, alumina trihydrate, magnesium carbonate hydrate, magnesium carbonate, or mixtures thereof. Magnesium hydroxide either of synthetic or of natural origin (brucite) is particularly preferred.

With the aim of improving compatibility between inorganic filler and polymeric material, a coupling agent can be added either in the material or onto the organic filler or both. This coupling agent can be selected from: saturated silane compounds or silane compounds containing at least one ethylenic unsaturation; epoxides containing an ethylenic unsaturation; monocarboxylic acids or, preferably, dicarboxylic acids having at least one ethylenic unsaturation, or derivatives thereof, in particular anhydrides or esters.

Preferred silane compounds suitable for this purpose are: γ-methacryloxypropyl-tri-methoxysilane, methyltriethoxysilane, methyltris (2-methoxyethoxy)silane, dimethyldiethoxysilane, vinyltris (2-methoxyethoxy)-silane, vinyltrimethoxysilane, vinyl-triethoxy-silane, octyltriethoxysilane, isobutyl-triethoxysilane, isobutyltrimethoxysilane and mixtures thereof.

Preferred epoxides containing an ethylenic unsaturation are: glycidyl acrylate, glycidyl methacrylate, monoglycidyl ester of itaconic acid, glycidyl ester of maleic acid, vinyl glycidyl ether, allyl glycidyl ether, or mixtures thereof.

Preferred monocarboxylic or dicarboxylic acids, having at least one ethylenic unsaturation, or derivatives thereof, as coupling agents are, for example: maleic acid, maleic anhydride, stearic acid, fumaric acid, citraconic acid, itaconic acid, acrylic acid, methacrylic acid and the like, and anhydrides or esters derived therefrom, or mixtures thereof. Maleic anhydride is particularly preferred.

Other conventional components such as antioxidants, processing coadjuvants, lubricants, pigments, other fillers and the like can be added to the buffer polymeric material of the present invention.

Other processing co-adjuvants possibly added to the polymer material are, for example, calcium stearate, zinc stearate, stearic acid, paraffin wax, silicone rubbers and the like, or mixtures thereof.

The telecommunication cable according to the present invention is equipped with at least one buffered optical fiber, preferably with a plurality of buffered optical fibers, according to the present invention. The buffered optical fibers are usually contained by at least one polymeric cable sheath. The polymeric cable sheath has mainly the function of grouping and protecting the optical fibers from mechanical stresses, particularly from compression lateral forces, and is usually made from a substantially rigid polymeric material, e.g. by medium density polyethylene (MDPE), high density polyethylene (HDPE) or polypropylene random copolymer. To impart flame resistance to the polymeric sheath, flame retardant fillers may be added, e.g. magnesium hydroxide or alumina trihydrate.

Preferably, at least one reinforcing element is embedded into the polymeric sheath and disposed along the length of the cable, so as to reduce mechanical stresses on the optical fibers due to tensile forces. Usually the reinforcing element is made from a glass reinforced polymer (GRP) rod or from an aramid rod.

Steel or aluminum tapes or other protecting elements known in the field of telecommunication cables may be present.

The buffered optical fiber according to the present invention may be produced according to known techniques. For example, the manufacturing process may be carried out in two steps, the first one comprising the sub-steps of drawing the optical waveguide and coating it with at least one protective coating. At the end of this first step the resulting unbuffered optical fiber is collected onto a reel and fed to the second step. The second step comprises the deposition of the tight buffer layer, which is usually obtained by extrusion of the polymeric material around the optical fiber by means of a cross-head extruder.

BRIEF DESCRIPTION OF THE DRAWINGS

Further characteristics will be apparent from the detailed description given hereinafter with reference to the accompanying drawings, in which:

FIG. 1 is a cross-sectional view of an optical fiber according to the present invention;

FIG. 2 is a cross-sectional view of a telecommunication cable according to the present invention;

FIG. 4 is a schematic representation of an indoor installation;

FIG. 5 is a schematic representation of a branching-off connection using a tight buffered fiber according to the invention.

Figure 3:
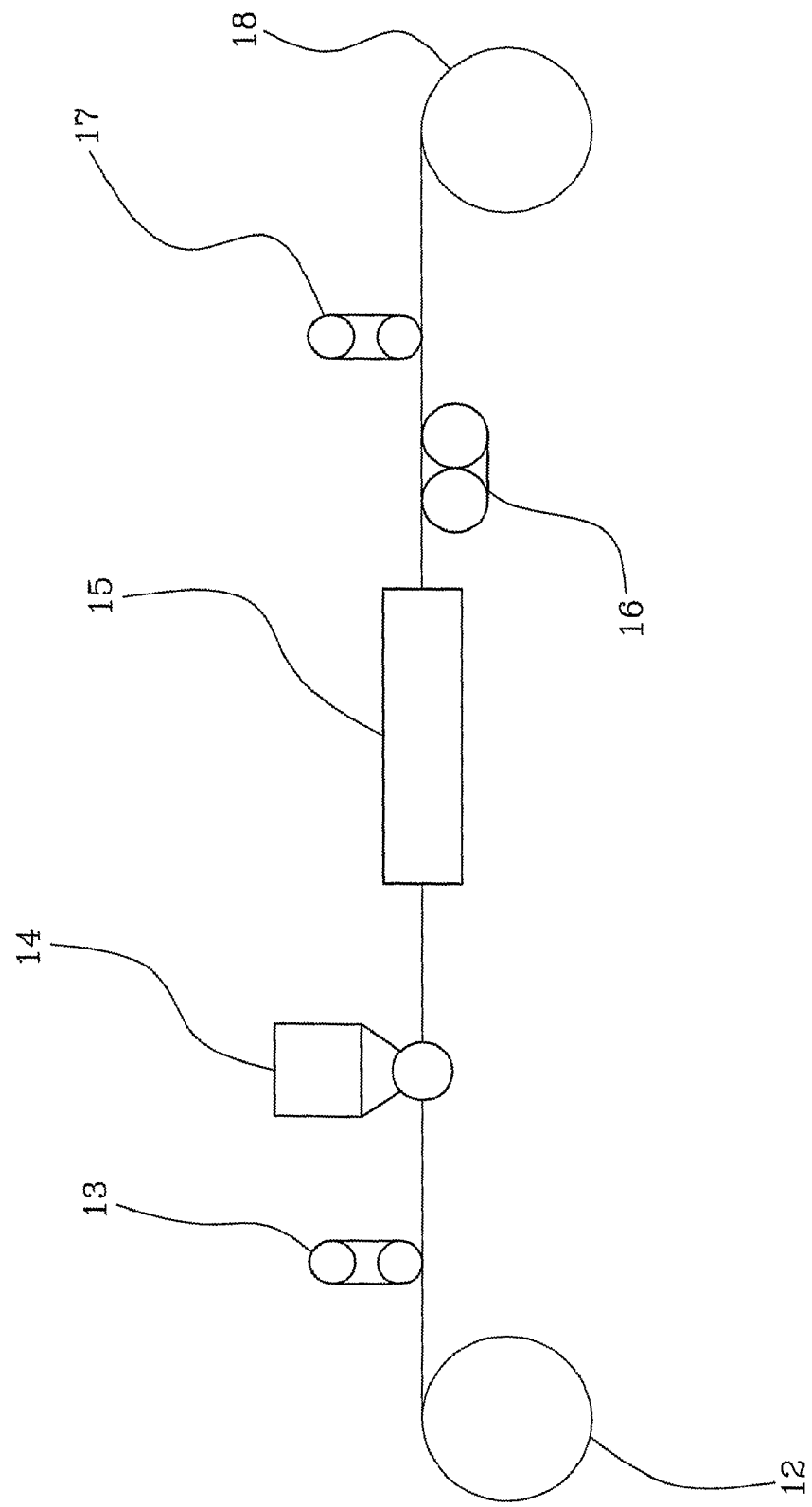
FIG. 3 is a schematic view of an exemplary manufacturing line for producing optical fibers according to the present invention.

The above figures show only preferred embodiments of the invention. Suitable modifications can be made to these embodiments according to specific technical needs and application requirements without departing from the scope of the invention.

DETAILED DESCRIPTION OF THE PREFERRED EMBODIMENTS

With reference to FIG. 1, an optical fiber (1) according to the present invention comprises an optical waveguide (2) constituted by a light-transmitting core (3) surrounded by a cladding (4). The core (3) and cladding (4) are preferably made of a silica-based material, the material of the cladding (4) having a refraction index lower than the refraction index of the core (3).

The optical waveguide (2) is preferably surrounded by at least one protective coating, usually by two protective coatings (5, 6). The first protective coating (5) (primary coating) directly contacts the optical waveguide (2), while the second protective coating (6) (secondary coating) overlies the first one (5). The buffer layer (7) is surrounding the optical fiber directly in contact with the secondary coating (6).

Typically, the first and second coatings (5, 6) are made from radiation curable coating compositions comprising radiation curable oligomers which are compatible one with the other, but with different properties. For example, a soft primary coating (5), usually having an elastic modulus of about 1-2 MPa, surrounds the optical waveguide (2), while a relatively rigid secondary coating (6), usually having an elastic modulus of about 500-1000 MPa, surrounds the primary coating (5). For instance, the radiation curable oligomers may have a backbone derived from polypropylenglycol and a dimer acid based polyester polyol. Preferably, the oligomer is a urethane acrylate oligomer comprising said backbone, more preferably a fully aliphatic urethane acrylate oligomer. For example, the first protective coating (5) is made from a radiation curable composition comprising a radiation curable oligomer as disclosed in International patent application WO 01/05724.

For the second protective coating (6) a formulation sold under the tradename DeSolite™ 3471-2-136 (by DSM) may be used.

Preferably, the optical fiber of the present invention is a bend-insensitive optical fiber according to ITU-T G.657, for example CasaLight™ (marketed by Prysmian).

The protective coatings (5, 6) usually include an identifying means, such as an ink or other suitable indicia for identification.

In FIG. 1, with D1 it is indicated the diameter of the optical fiber before application of the tight buffer. As indicated hereinabove, D1 has preferably a value of from 160 μm to 280 μm, more preferably from 175 μm to 260 μm, even more preferably from 240 μm to 250 μm In FIG. 1, with D2 it is indicated the diameter of the optical fiber after application of the tight buffer. As indicated hereinabove, D2 has preferably a value of from 600 μm to 1000 μm, more preferably from 800 μm to 900 μm.

With reference to FIG. 2, a telecommunication cable (8) according to the present invention comprises a plurality of buffered optical fibers (1) loosely disposed into the internal space of a polymeric sheath (9) of tubular form. In FIG. 2, two reinforcing elements (10) are embedded into the polymeric sheath (9) running along the longitudinal development of the cable. The reinforcing elements (10) may be made from a glass reinforced polymer (GRP) rod or an aramide rod. In correspondence of each reinforcing element (10), a notch (11) may be present which runs longitudinally on the external surface of the polymeric sheath (9). The notch may be useful to the installer for identifying the position of the at least one reinforcing element optionally present so as to avoid the cutting of such element in the process of accessing to the optical fibers contained within the cable sheath.

Preferably, the free space between the polymeric sheath (9) and the optical fibers (1) may contain a sliding aid for pulling the optical fibers, for example talc.

With reference to FIG. 3, the unbuffered optical fiber, comprising the optical waveguide coated with at least one protective coating, is paid-off from a pay-off reel (12). The tension of the optical fiber is controlled by a pay-off tension control device (13). The optical fiber then enter the extruder cross-head where it is covered by the polymeric material forming the tight buffer layer. The extruder cross-head includes a die and a tip defining a frustoconical space where the polymeric material flows. The optical fiber passes through the tip and the polymeric material is laid down on the external surface of the optical fiber by shrinking with the aid of a reduced pressure generated within the tip. The above reduced pressure shall be carefully controlled to have a coupling of the buffer layer onto the optical fiber sufficiently tight so as to achieve the desired average strip force as indicated above. Preferably a reduced pressure of from −0.1 to −0.3 bar may be applied. The buffered optical fiber is then passed through a cooling trough (15) where the polymeric material is cooled down, usually by means of water or air, so as to stabilize its shape and dimensions. The linear movement of the optical fiber is achieved by means of a line capstan (16). After exiting the cooling trough (15), the buffered optical fiber is wound onto a take-up reel (18) with a certain tension which is controlled by a take-up tension control (17).

With reference to FIG. 4, a riser cable (19) is installed starting from the distribution cabinet (20), generally located in the building basement, up to the last floor (21). At each floor (or where needed) at least one riser box (22) is provided for the connection to the single customer termination boxes (23). When a connection is to be made (reference is made to FIG. 5), a window (26) is cut in the cable sheath. One fiber (1) of the bundle (24) of tight buffered fibers is cut, at a certain distance downstream the window (26), i.e. at an upper floor of the building (typically up to 20 m from the window 26) and is pulled down out of the riser cable (19), then positioned inside the riser box (22). The fiber (1) is pulled till the user's termination box (23) where a portion of the tight buffer is stripped off for a length suitable for the mechanical or fusion splicing of the fiber (1) into the splicing box (25). For the length from the riser box (22) to the user's termination box (23), the fiber (1) can be optionally inserted into a protective tube (not shown), preferably made of flame-retardant, low friction polymeric material, previously installed.

The following working examples are given to better illustrate the invention, but without limiting it.

EXAMPLE 1

Preparation of a Polymeric Composition

A polymeric composition were prepared by using the components as shown in Table 1 (the amounts are expressed as % by weight with respect to the total weight of the polymeric composition).

TABLE 1

| Component | wt % |
|---|---|
| Lotryl ® 17BA07 | 30.2 |
| Lotryl ® 30BA02 | 7.1 |
| Clearflex ® CLB0 | 10.1 |
| Fusabond ® MC 250D | 3 |
| Hydrofy ® GS 1.5 | 47.2 |

TABLE 1-continued

| Component | wt % |
|---|---|
| Rhodorsil ® GUM 901 | 2 |
| Irganox ® 1010 | 0.4 |

Lotryl ® 17BA07 (Atofina): copolymer ethylene-butyl acrylate containing 16% to 19% by weight of acrylic ester;
Lotryl ® 30BA02 (Atofina): copolymer ethylene-butyl acrylate containing 28% to 32% by weight of acrylic ester;
Clearflex ® CLB0 (Polimeri Europa): very low density polyethylene;
Fusabond ® MC 250D (DuPont): ethylene-vinyl acetate (28% vinyl acetate);
Hydrofy ® GS1.5 (Sima): magnesium hydroxide coated with stearic acid;
Rhodorsil ® GUM 901 (Rhodia): dimethylsiloxane, methyl vinyl terminated gum;
Irganox ® 1010 (Ciba Specialty Chemicals): phenolic antioxidant.

The composition were prepared by mixing the components as shown in Table 1 in a closed mixer. The mixtures were then granulated and the obtained granules were used for manufacturing the tight buffer layer, as shall be described hereinbelow.

The above polymeric composition was characterized as follows:

| | |
|---|---|
| ultimate elongation: | 90.6% (CEI EN 60811-1-1 measured on a plate); |
| ultimate tensile strength: | 8.2 MPa (CEI EN 60811-1-1 measured on a plate); |
| shrinkage: | 0.675% (internal standard); |
| elasticity modulus: | 77.0 MPa (ASTM D-638-97): |
| hardness Shore A: | 93 (ASTM D-2240); |
| hardness Shore D: | 36.8 (ASTM D-2240). |

EXAMPLE 2

Preparation of a Tight Buffer Optical Fiber

The polymeric composition as prepared in Example 1 was applied by extrusion onto an optical fiber having an overall diameter of 245±5 μm, with a primary coating having a thickness of 32.5 μm and a secondary coating having a thickness of 27.5 μm.

The operating conditions of the extruding line were the following:
conic tip inner diameter: 0.45 mm;
conic tip outer diameter: 0.90 mm;
conic die inner diameter: 1.90 mm;
vacuum: −0.1 bar
line speed: 60 m/min;
thermal profile: 125° C. (zone 1), 140° C. (zone 2), 150° C. (zone 3), 160° C. (collar), 165° C. (head);
cooling trough: air at 25° C.;
fibre pay off tension: 100 g
buffered fibre take-up tension: 200 g The so obtained buffered optical fiber had an external diameter of 900 μm.

The following measurements were made on the buffered optical fiber (mean values calculated from nine tested samples):
average strip force: 0.22 N/15 mm (measured according to FOTP/184/TIA/EIA standard carried out at a stripping speed of 10 mm/min);
peak strip force: 1.84 N/15 mm (measured according to FOTP/184/TIA/EIA standard carried out at a stripping speed of 10 mm/min);
friction coefficient between buffer and optical fiber: 0.27.

Said friction coefficient was measured as follows. The buffered optical fiber has been wrapped around a mandrel; one optical fiber end (free from the buffer layer) is connected with a load cell; the other optical fiber end (free from the buffer layer) is connected with a weight; the load cell measures the force necessary to move 50 mm of optical fiber through the buffer coating. Test set up:
mandrel diameter: 315 mm
weight (P)=1 N
Pulling speed=500 mm/min
α=5/2π(1+¼ round)

Hereinbelow the formula for the calculation of the friction coefficient is provided $$T = P * e^{f\alpha}$$

wherein T is the force measured by the load cell; P is the applied weight; f is the friction coefficient and α is the wrapping angle. Thus, the friction coefficient was determined according to:

$$f = \frac{LN(T/P)}{\alpha}$$

EXAMPLE 3

Manual Stripping Test

Five buffered optical fibers according to the invention coming from different production batches were employed for the test. The buffer layers were manually stripped-off the fibers by the same operator at increasing lengths starting from 10 cm. All of the five optical fibers were easily deprived of the buffer thereof until a length of 50 cm. At a length of 90 cm the buffer of two optical fibers could not be stripped off. For the remaining three, the coherence between buffer and optical fiber (impeding the buffer stripping-off) was reached at 120 cm (two fibers) and 130 cm (one fiber).

The invention claimed is:

1. A telecommunication cable comprising at least one optical fiber, each optical fiber being separately coated by and in direct contact with a tight buffer layer comprising an extruded polymeric material having an ultimate elongation equal to or lower than 100% and an ultimate tensile strength equal to or lower than 10 MPa, wherein sais at least one optical fiber includes an optical waveguide and optionally at least one protective coating.

2. The telecommunication cable according to claim 1, wherein the optical waveguide is a single-mode optical fibre.

3. The telecommunication cable according to claim 1, wherein the optical fiber is a bend-insensitive optical fiber.

4. The telecommunication cable according to claim 1, wherein the optical fiber has a diameter of 160 μm to 280 μm.

5. The telecommunication cable according to claim 4, wherein the optical fiber has a diameter of 240 μm to 250 μm.

6. The telecommunication cable according to claim 1, wherein the tight buffer layer has a thickness capable of providing a buffered optical fibre with a diameter of 650 μm to 1000 μm.

7. The telecommunication cable according to claim 6, wherein the diameter of the buffered optical fibre is 800 μm to 900 μm.

8. The telecommunication cable according to claim 1, wherein the polymeric material has an ultimate elongation of at least 50%.

9. The telecommunication cable according to claim 1, wherein the polymeric material has an ultimate tensile strength of at least 4 MPa.

10. The telecommunication cable according to claim 1, wherein the polymeric material has an elasticity modulus (Young's modulus) equal to or lower than 100 MPa.

11. The telecommunication cable according to claim 1, wherein the polymeric material has a Shore D hardness lower than 50.

12. The telecommunication cable according to claim 1, wherein the buffer layer has an average strip force of 0.1 N/15 mm to 0.5 N/15 mm.

13. The telecommunication cable according to claim 1, wherein the buffer layer has a peak strip force of 1 N/15 mm to 3.5 N/15 mm.

14. The telecommunication cable according to claim 1, wherein the buffer layer has an average shrinkage, measured after 24 hours at 70° C., of 3 mm/1000 mm to 15 mm/1000 mm.

15. The telecommunication cable according to claim 14, wherein the buffer layer has an average shrinkage, measured after 24 hours at 70° C., of 5 mm/1000 mm to 10 mm/1000 mm.

16. The telecommunication cable according to claim 1, wherein the polymeric material comprises at least one polymer selected from:

polyethylene; copolymers of ethylene with at least one $C_3$-$C_{12}$ alpha-olefin; copolymers of ethylene with at least one $C_3$-$C_{12}$ alpha-olefin and with at least one $C_4$-$C_{20}$ diene; copolymers of ethylene with at least one alkyl-acrylate or alkyl-methacrylate; polyvinylchloride; ethylene/vinyl acetate copolymers; polyurethanes; poiyetheresters; and mixtures thereof.

17. The telecommunication cable according to claim 15, wherein the polymeric material comprises at least one polymer selected from: low density polyethylene, very low density polyethylene, linear low density polyethylene, ethylene/butylacrylate copolymers, and mixtures thereof.

18. The telecommunication cable according to claim 16, wherein the polymeric material comprises, in admixture with the at least one polymer, at least one inorganic filler.

19. The telecommunication cable according to claim 18, wherein the inorganic filler comprises 30 to 70% by weight with respect to the total weight of the polymeric material.

20. The telecommunication cable according to claim 18, wherein the inorganic filler is selected from: hydroxides, oxides or hydrated oxides, salts or hydrated salts of at least one metal, or mixtures thereof.

21. The telecommunication cable according to claim 20, wherein the inorganic filler is selected from: magnesium hydroxide, aluminum hydroxide, aluminum oxide, alumina trihydrate, magnesium carbonate hydrate, magnesium carbonate, and mixtures thereof.

22. The telecommunication cable according to claim 21, wherein the inorganic filler is selected from synthetic or natural magnesium hydroxide.

23. The telecommunication cable according to claim 18, wherein the polymeric material further comprises at least one coupling agent selected from: saturated silane compounds or silane compounds containing at least one ethylenic unsaturation; epoxides containing ethylenic unsaturation; monocarboxylic acids or dicarboxylic acids having at least one ethylenic unsaturation, and derivatives thereof.

24. The telecommunication cable according to claim 1, wherein the cable comprises 12 to 48 optical fibers.

25. The telecommunication cable according to claim 1, further comprising at least one cable sheath surrounding the at least one optical fiber.

26. The telecommunication cable according to claim 25, wherein the cable sheath comprises a substantially rigid polymeric material.

27. The telecommunication cable according to claim 26, wherein the polymeric material of the cable sheath comprises at least one flame-retardant filler.

28. The telecommunication cable according to claim 25, wherein at least one reinforcing element is embedded in the polymeric sheath and is disposed along the length of the cable.

29. The telecommunication cable according to claim 28, wherein the reinforcing element is made from a glass reinforced polymer rod or from an aramid rod.

30. An optical fiber coated by and in direct contact with a tight buffer layer comprising an extruded polymeric material having an ultimate elongation equal to or lower than 100% and an ultimate tensile strength equal to or lower than 10 MPa, wherein said at least one optical fiber includes an optical waveguide and optionally at least one protective coating.

31. An optical fiber according to claim 30, wherein the optical waveguide is a single-mode optical fibre; or wherein the optical fiber is a bend-insensitive optical fiber; or wherein the optical fiber has a diameter of 160 μm to 280 μm; or wherein the tight buffer layer has a thickness capable of providing a buffered optical fibre with a diameter of 650 μm to 1000 μm; or wherein the polymeric material has an ultimate elongation of at least 50%; or wherein the polymeric material has an ultimate tensile strength of at least 4 MPa; or wherein the polymeric material has an elasticity modulus (Young's modulus) equal to or lower than 100 MPa; or wherein the polymeric material has a Shore D hardness lower than 50; or wherein the buffer layer has an average strip force of 0.1 N/15 mm to 0.5 N/15 mm; or wherein the buffer layer has an average shrinkage, measured after 24 hours at 70° C., of 3 mm/1000 mm to 15 mm/1000 mm; or wherein the polymeric material comprises at least one polymer selected from: polyethylene; copolymers of ethylene with at least one $C_3$-$C_{12}$ alpha-olefin; copolymers of ethylene with at least one $C_3$-$C_{12}$ alpha-olefin and with at least one $C_4$-$C_{20}$ diene; copolymers of ethylene with at least one alkyl-acrylate or alkyl-methacrylate; polyvinylchloride; ethylene/vinyl acetate copolymers; polyurethanes; polyetheresters; and mixtures thereof; or wherein the polymeric material comprises at least one polymer selected from: low density polyethylene, very low density polyethylene, linear low density polyethylene, ethylene/butylacrylate copolymers, and mixtures thereof; or wherein the polymeric material comprises, in admixture with the at least one polymer, at least one inorganic filler; or wherein the polymeric material further comprises at least one coupling agent selected from: saturated silane compounds or silane compounds containing at least one ethylenic unsaturation; epoxides containing ethylenic unsaturation; monocarboxylic acids or dicarboxylic acids having at least one ethylenic unsaturation, and derivatives thereof.

* * * * *